United States Patent
Xie

(10) Patent No.: US 10,659,675 B2
(45) Date of Patent: May 19, 2020

(54) TERMINAL, SHOOTING METHOD THEREOF AND COMPUTER STORAGE MEDIUM

(71) Applicant: NUBIA TECHNOLOGY CO., LTD., Shenzhen (CN)

(72) Inventor: Shuxun Xie, Shenzhen (CN)

(73) Assignee: NUBIA TECHNOLOGY CO., LTD., Shenzhen (CN)

( * ) Notice: Subject to any disclaimer, the term of this patent is extended or adjusted under 35 U.S.C. 154(b) by 22 days.

(21) Appl. No.: 16/064,143

(22) PCT Filed: Sep. 20, 2016

(86) PCT No.: PCT/CN2016/099502
§ 371 (c)(1),
(2) Date: Jun. 20, 2018

(87) PCT Pub. No.: WO2017/107596
PCT Pub. Date: Jun. 29, 2017

(65) Prior Publication Data
US 2019/0007625 A1 Jan. 3, 2019

(30) Foreign Application Priority Data
Dec. 23, 2015 (CN) .......................... 2015 1 0974333

(51) Int. Cl.
*H04N 5/232* (2006.01)

(52) U.S. Cl.
CPC ... *H04N 5/232133* (2018.08); *H04N 5/23219* (2013.01); *H04N 5/23232* (2013.01); *H04N 5/232945* (2018.08)

(58) Field of Classification Search
None
See application file for complete search history.

(56) References Cited

U.S. PATENT DOCUMENTS

2007/0296848 A1* 12/2007 Terashima ............. G03B 13/14
348/345
2011/0043655 A1* 2/2011 Park ................... H04N 5/23212
348/222.1
(Continued)

FOREIGN PATENT DOCUMENTS

CN 101615289 A 12/2009
CN 101720027 A 6/2010
(Continued)

OTHER PUBLICATIONS

English translation of CN104867125 Jing et al. CN104867125 was provided by applicant in the IDS filed Jun. 20, 2018. (Year: 2015).*
(Continued)

*Primary Examiner* — James M Hannett
(74) *Attorney, Agent, or Firm* — Anova Law Group, PLLC

(57) ABSTRACT

The present disclosure provides a terminal, a shooting method thereof and a computer storage medium, the shooting method includes: generating an focus frame corresponding to a shooting target in a preview image; acquiring image data in the focus frame of each shooting target when focus is the clearest during focusing process; composing the image data in the focus frame of all the shooting target to generate a final shooting image, according to a preset image composing technology in a final preview image when determining focal length.

12 Claims, 7 Drawing Sheets

(56) References Cited

U.S. PATENT DOCUMENTS

2012/0120269 A1 5/2012 Capata et al.
2014/0204236 A1 7/2014 Yoon et al.

FOREIGN PATENT DOCUMENTS

| CN | 101998061 A | 3/2011 |
| CN | 102075679 A | 5/2011 |
| CN | 102982522 A | 3/2013 |
| CN | 104867125 A | 8/2015 |
| CN | 105578045 A | 5/2016 |

OTHER PUBLICATIONS

The World Intellectual Property Organization (WIPO) International Search Report for PCT/CN2016/099502 dated Nov. 29, 2016 7 Pages.

* cited by examiner

| 0% | 5% | 10% | 15% | 20% | 25% | 30% | 35% | 40% | 45% | 50% | 55% | 60% | 65% | 70% | 75% | 80% | 85% | 90% | 95% |
|---|---|---|---|---|---|---|---|---|---|---|---|---|---|---|---|---|---|---|---|
| A20 | A19 | A18 | A17 | A16 | A15 | A14 | A13 | A12 | A11 | A10 | A9 | A8 | A7 | A6 | A5 | A4 | A3 | A2 | A1 |

| 100% | 95% | 90% | 85% | 80% | 75% | 70% | 65% | 60% | 55% | 50% | 45% | 40% | 35% | 30% | 25% | 20% | 15% | 10% | 5% |
|---|---|---|---|---|---|---|---|---|---|---|---|---|---|---|---|---|---|---|---|
| B1 | B2 | B3 | B4 | B5 | B6 | B7 | B8 | B9 | B10 | B11 | B12 | B13 | B14 | B15 | B16 | B17 | B18 | B19 | B20 |

TERMINAL, SHOOTING METHOD THEREOF AND COMPUTER STORAGE MEDIUM

CROSS-REFERENCE TO RELATED APPLICATIONS

This application is a national phase entry under 35 U.S.C. § 371 of International Application No. PCT/CN2016/099502, filed on Sep. 20, 2016, which claims priority to and benefits of Chinese Patent Application Serial No. 201510974333.9, filed with the State Intellectual Property Office of P. R. China on Dec. 23, 2015, the entire content of all of which is incorporated herein by reference.

FIELD OF THE TECHNOLOGY

The present disclosure generally relates to the field of terminal data processing technology and, more particularly, relates to a terminal, shooting method thereof and computer storage medium.

BACKGROUND

In photographing, if the frame includes multiple shooting targets, taking multiple faces as an example, when the depth of field of the lens is relatively small, all people must be in the same focal plane, that is, all the faces need to be in the depth of field in order to make everyone's face clearly visible. When multiple faces are in different focal planes, due to the relationship of depth of field, the face in the depth of field can be photographed clearly, while the face outside the depth of field is not clearly.

BRIEF SUMMARY OF THE DISCLOSURE

The main objective of the embodiments of the present disclosure is to provide a terminal, shooting method thereof and computer storage medium, so as to make shooting targets in different depth of field clear in captured images.

To achieve the above objective, the technical solution of the embodiment of the present disclosure is implemented in this way:

In a first aspect, the embodiment of the present invention provides a shooting method for a terminal, the method comprising:

generating an focus frame corresponding to a shooting target in a preview image;

acquiring image data in the focus frame of each shooting target when focus is the clearest during focusing process;

composing the image data in the focus frame of all the shooting target to generate a final shooting image, according to a preset image composing technology in a final preview image when determining focal length.

In one embodiment, wherein acquiring image data in the focus frame of each shooting target when focus is the clearest during focusing process, comprising:

buffering the image data in the focus frame of the shooting target, when value of contrast of pixels of the shooting target is the largest.

In one embodiment, wherein composing the image data in the focus frame of all the shooting target to generate a final shooting image, according to a preset image composing technology in a final preview image when determining focal length, comprising:

generating a transition area of a preset range at edge of the focus frame of the shooting target i; wherein, i is the sequence number of the shooting target, which ranges from 1 to N, and N is amount of shooting targets;

splicing the image data in the focus frame of the shooting target i when the focus is clearest to the corresponding focus frame in the final preview image;

composing image data of a first transition area corresponding to the shooting target i when the focus is clearest and image date of a second transition area corresponding to the shooting target i in the final preview image.

In one embodiment, wherein composing image data of a first transition area corresponding to the shooting target i when the focus is clearest and image date of a second transition area corresponding to the shooting target i in the final preview image, comprising:

setting a first weight value for each pixel point along a first direction from edge of the focus frame to edge of the transition area in the range of the first transition area of the shooting target i; wherein the first weight value decreases gradually along the first direction;

setting a second weight value for each pixel point along a second direction from edge of the transition area to edge of the focus frame in the range of the second transition area of the shooting target i; wherein the second weight value decreases gradually along the second direction;

performing a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

In one embodiment, wherein, the method further comprising:

the shooting target is in the clearest state when contrast value of the pixel value of the shooting target is maximum, under the condition that contrast characteristic of the pixel value of the shooting target is used as measure of definition.

In a second aspect, the embodiment of the present invention provides a terminal, the terminal comprising: a generating unit, a focusing unit, an acquisition unit and a composition unit, wherein, the generating unit is configured to generate an focus frame corresponding to a shooting target in a preview image;

the focusing unit is configured to perform shooting focus and triggering the acquisition unit during shooting focus;

the acquisition unit is configured to acquire image data in the focus frame of each shooting target when focus is the clearest;

the composition unit is configured to compose the image data in the focus frame of all the shooting target to generate a final shooting image, according to a preset image composing technology in a final preview image when determining focal length.

In one embodiment, wherein, the acquisition unit is configured to buffer the image data in the focus frame of the shooting target, when value of contrast of pixels of the shooting target is the largest.

In one embodiment, wherein the composition unit comprising: a transition area generating subunit, a splicing subunit, and a composition subunit; wherein, the transition area generating subunit is configured to generate a transition area of a preset range at edge of the focus frame of the shooting target i; wherein, i is the sequence number of the shooting target, which ranges from 1 to N, and N is amount of shooting targets;

the splicing subunit is configured to splice the image data in the focus frame of the shooting target i when the focus is clearest to the corresponding focus frame in the final preview image;

the composition subunit is configured to compose image data of a first transition area corresponding to the shooting target i when the focus is clearest and image date of a second transition area corresponding to the shooting target i in the final preview image.

In one embodiment, wherein, the composition subunit is configured to set a first weight value for each pixel point along a first direction from edge of the focus frame to edge of the transition area in the range of the first transition area of the shooting target i; wherein the first weight value decreases gradually along the first direction;

set a second weight value for each pixel point along a second direction from edge of the transition area to edge of the focus frame in the range of the second transition area of the shooting target i; wherein the second weight value decreases gradually along the second direction;

perform a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

In one embodiment, wherein, the acquisition unit is further configured to make the shooting target in the clearest state when contrast value of the pixel value of the shooting target is maximum, under the condition that contrast characteristic of the pixel value of the shooting target is used as measure of definition.

In a third aspect, the embodiment of the present invention provides a computer storage medium, wherein the computer storage medium stores computer executable instructions, the computer executable instructions comprising:

generating an focus frame corresponding to a shooting target in a preview image;

acquiring image data in the focus frame of each shooting target when focus is the clearest during focusing process;

composing the image data in the focus frame of all the shooting target to generate a final shooting image, according to a preset image composing technology in a final preview image when determining focal length.

In one embodiment, wherein, the computer executable instructions further comprising:

buffering the image data in the focus frame of the shooting target, when value of contrast of pixels of the shooting target is the largest.

In one embodiment, wherein, the computer executable instructions further comprising:

generating a transition area of a preset range at edge of the focus frame of the shooting target i; wherein, i is the sequence number of the shooting target, which ranges from 1 to N, and N is amount of shooting targets;

splicing the image data in the focus frame of the shooting target i when the focus is clearest to the corresponding focus frame in the final preview image;

composing image data of a first transition area corresponding to the shooting target i when the focus is clearest and image date of a second transition area corresponding to the shooting target i in the final preview image.

In one embodiment, wherein, the computer executable instructions further comprising:

setting a first weight value for each pixel point along a first direction from edge of the focus frame to edge of the transition area in the range of the first transition area of the shooting target i; wherein the first weight value decreases gradually along the first direction;

setting a second weight value for each pixel point along a second direction from edge of the transition area to edge of the focus frame in the range of the second transition area of the shooting target i; wherein the second weight value decreases gradually along the second direction;

performing a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

In one embodiment, wherein, the computer executable instructions further comprising:

the shooting target is in the clearest state when contrast value of the pixel value of the shooting target is maximum, under the condition that contrast characteristic of the pixel value of the shooting target is used as measure of definition.

In a fourth aspect, the embodiment of the present invention provides a terminal, comprising a processor and a storage, wherein, the storage stores computer executable instructions, the processor performs corresponding processing according to the computer executable instructions;

the processor is configured to:

generate an focus frame corresponding to a shooting target in a preview image;

acquire image data in the focus frame of each shooting target when focus is the clearest during focusing process;

compose the image data in the focus frame of all the shooting target to generate a final shooting image, according to a preset image composing technology in a final preview image when determining focal length.

In one embodiment, wherein, the processor is further configured to:

buffer the image data in the focus frame of the shooting target, when value of contrast of pixels of the shooting target is the largest.

In one embodiment, wherein, the processor is further configured to:

generate a transition area of a preset range at edge of the focus frame of the shooting target i; wherein, i is the sequence number of the shooting target, which ranges from 1 to N, and N is amount of shooting targets;

splice the image data in the focus frame of the shooting target i when the focus is clearest to the corresponding focus frame in the final preview image;

compose image data of a first transition area corresponding to the shooting target i when the focus is clearest and image date of a second transition area corresponding to the shooting target i in the final preview image.

In one embodiment, wherein, the processor is further configured to:

set a first weight value for each pixel point along a first direction from edge of the focus frame to edge of the transition area in the range of the first transition area of the shooting target i; wherein the first weight value decreases gradually along the first direction;

set a second weight value for each pixel point along a second direction from edge of the transition area to edge of the focus frame in the range of the second transition area of the shooting target i; wherein the second weight value decreases gradually along the second direction;

perform a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

In one embodiment, wherein, the processor is further configured to:

make the shooting target in the clearest state when contrast value of the pixel value of the shooting target is maximum, under the condition that contrast characteristic of the pixel value of the shooting target is used as measure of definition.

A terminal, a shooting method thereof and a computer storage medium provided by the embodiments of the present invention, when shooting at the terminal, compose the clearest image of the shooting target with different depths of field during the shooting by a preset image composing technology. Thus, it is possible to make the shooting target in different depth of field clear in the shot image.

DETAILED DESCRIPTION

The technical solutions in the embodiments of the present disclosure will be described clearly and completely with reference to the accompanying drawings in the embodiments of the present disclosure.

The mobile terminal according to embodiments of the present invention will now be described with reference to the accompanying drawings FIG. 1. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
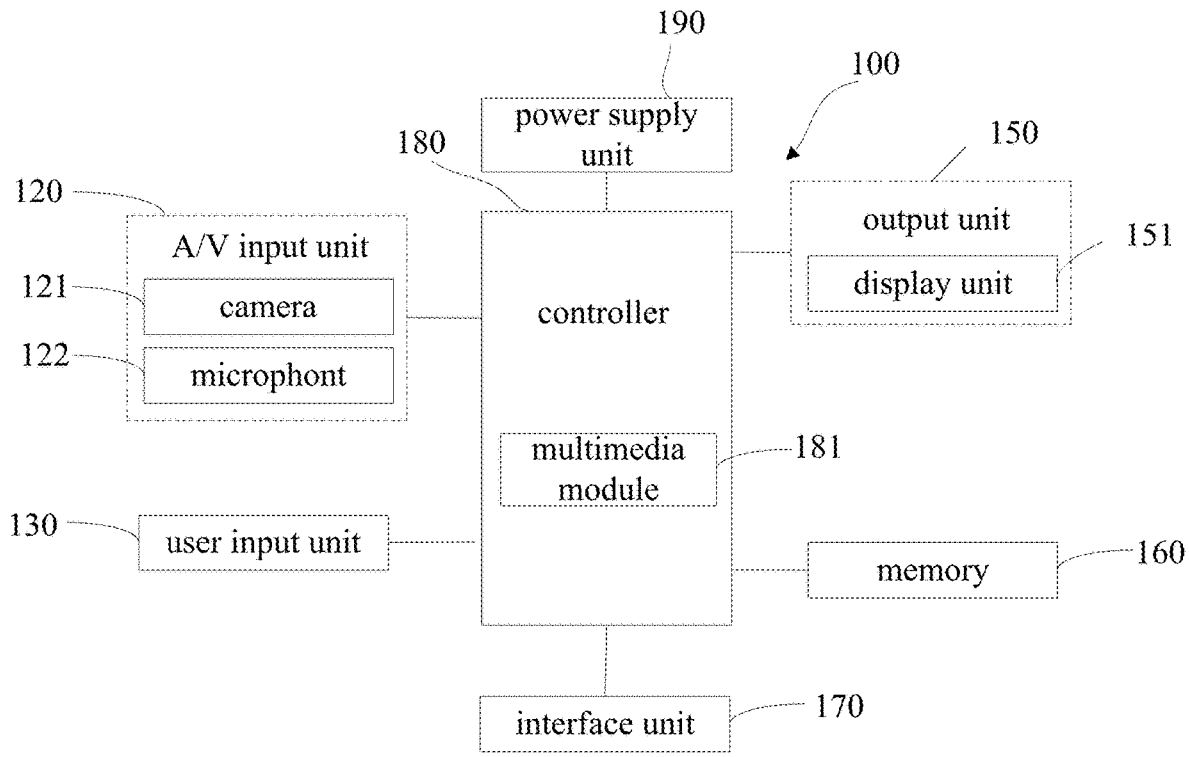
FIG. 1 is a schematic diagram of a mobile terminal according to one embodiment of the present disclosure.

FIG. 1 is a block diagram of a mobile terminal according to an embodiment of the present invention.

The mobile terminal 100 may include an A/V (Audio/Video) input unit 120, a user input unit 130, an output unit 150, a memory 160, an interface unit 170, a controller 180, a power supply unit 190 and the like. FIG. 1 shows the mobile terminal as having various components, but it should be understood that implementing all of the illustrated components is not a requirement. Greater or fewer components may alternatively be implemented.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151. The image frames processed by the camera 121 may be stored in the memory 160 (or other storage medium) or transmitted via the wireless communication unit 110. Two or more cameras 121 may be provided according to the configuration of the mobile terminal. The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 during the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is to overlaid on the display unit 151 in a layered manner, it may form a touch screen.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. The identification module may be a memory chip that stores various information for authenticating a user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may be operated as a signal for recognizing that the mobile terminal is accurately mounted on the cradle. The output unit 150 is configured to provide outputs in a visual, audible, and/or tactile manner (e.g., audio signal, video signal, alarm signal, vibration signal, etc.). The output unit 150 may include the display unit 151.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit and an internal display unit. The touch screen may be configured to detect even a touch input pressure as well as a touch input position and a touch input area.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminal, without being limited to the slide-type mobile terminal.

Based on the above mobile terminal hardware structure, various embodiments of the present disclosure are proposed.

Embodiment 1

Figure 2:
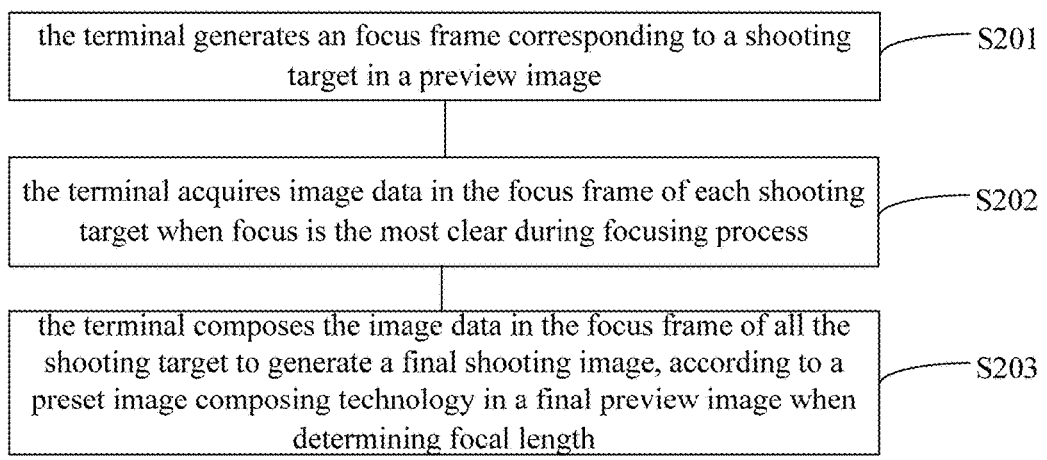
FIG. 2 is a flowchart of a shooting method for a terminal according to one embodiment of the present disclosure.

Referring to FIG. 2, FIG. 2 shows one embodiment of a shooting method for a terminal according to the present disclosure, the method can be applied in the terminal shown in FIG. 1, the method comprising:

S201: the terminal generates a focus frame corresponding to a shooting target in a preview image;

With reference to the terminal shown in FIG. 1, it should be noted that, after receiving the camera-on instruction input by the user, the user input unit 130 of the terminal acquire a preview image through a viewfinder of the camera 121, and identify shooting target according to a preset identification algorithm. After the shooting target in the preview image is identified, a corresponding focus frame is generated for each shooting target. Preferably, the terminal displays the preview image captured by the viewfinder of the camera 121 through the display unit 151, and the focus frame of each shooting target are also displayed in the preview image.

S202: the terminal acquires image data in the focus frame of each shooting target when focus is the clearest during focusing process;

It should be noted that, a specific shooting focusing process may be implemented by the camera 121 performing auto focus, and auto focus function is performed through contrast. The specific process may be controlling the movement of the lens assembly through the actuator, according to the change of contrast of the focus position, so as to seek out the lens position when the contrast is largest, that is, the exact focus position. The actuator includes one or more voice coil actuators, stepper motors, piezoelectric actuators, or other types of actuators that are capable of moving the lens assembly between different lens positions within the search range.

Understandably, since the lens of the mobile terminal is relatively simple and there are few lenses, the displacement of the lens assembly is very small. Therefore, the auto focus of the mobile terminal can be achieved through a voice coil motor (VCM), the VCM mainly consists of a coil, a magnet group and a shrapnel. The coil is fixed in the magnet group by two shrapnel. When the coil is electrified, the coil generates a magnetic field. The coil magnetic field interacts with the magnet group, and the coil moves upwards. The lens locks in the coil moves together. When the power is turned off, the coil returns under the elastic force of the shrapnel, and then realizes the auto focus function.

Based on the above mentioned principle of the auto focus of the mobile terminal, it can be known that, during the focusing process, the terminal obtains the image data of the focus frame when the focus is the clearest, specifically comprising:

buffers the image data in the focus frame of the shooting target, when value of contrast of pixels of the shooting target is the largest.

S203: the terminal composes the image data in the focus frame of all the shooting target to generate a final shooting image, according to a preset image composing technology in a final preview image when determining focal length.

It should be noted that, during the focusing process of the terminal, since the range of the depth of field where the shooting target located are different, some shooting targets may appear clear and some of the shooting targets may not be clear during the focusing process. Therefore, steps S203 may be performed to compose the sharp images of the shooting targets in the different depth of field acquired during the focusing process, so that the shooting targets with different depths of field can all be clearly displayed in the final shooting images.

Figure 3:
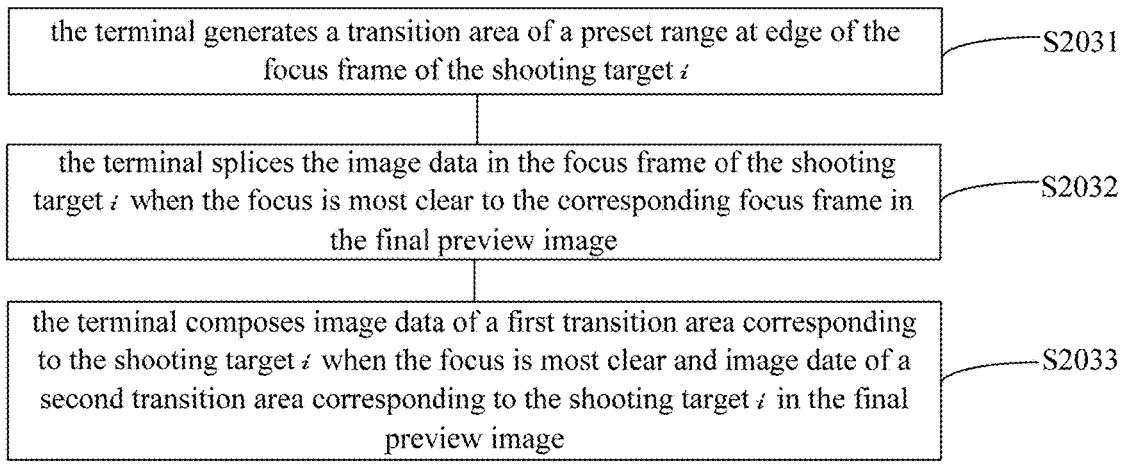
FIG. 3 is a flowchart of a generating shooting image method according to one embodiment of the present disclosure.

Specifically, since it is necessary to compose the shooting targets with different depths of field in the final preview image, the present embodiment uses a single shooting target i as an example to illustrate the specific composing process. It can be understood that, those skilled in the art can understand that the composing process of a single shooting target can be applied to all shooting targets. At this time, referring to FIG. 3, step S203 can specifically comprising:

S2031: the terminal generates a transition area of a preset range at edge of the focus frame of the shooting target i;

wherein, i is the sequence number of the shooting target, which ranges from 1 to, and is amount of shooting targets;

S2032: the terminal splices the image data in the focus frame of the shooting target i when the focus is clearest to the corresponding focus frame in the final preview image;

S2033: the terminal composes image data of a first transition area corresponding to the shooting target i when the focus is clearest and image date of a second transition area corresponding to the shooting target i in the final preview image.

Figure 4:
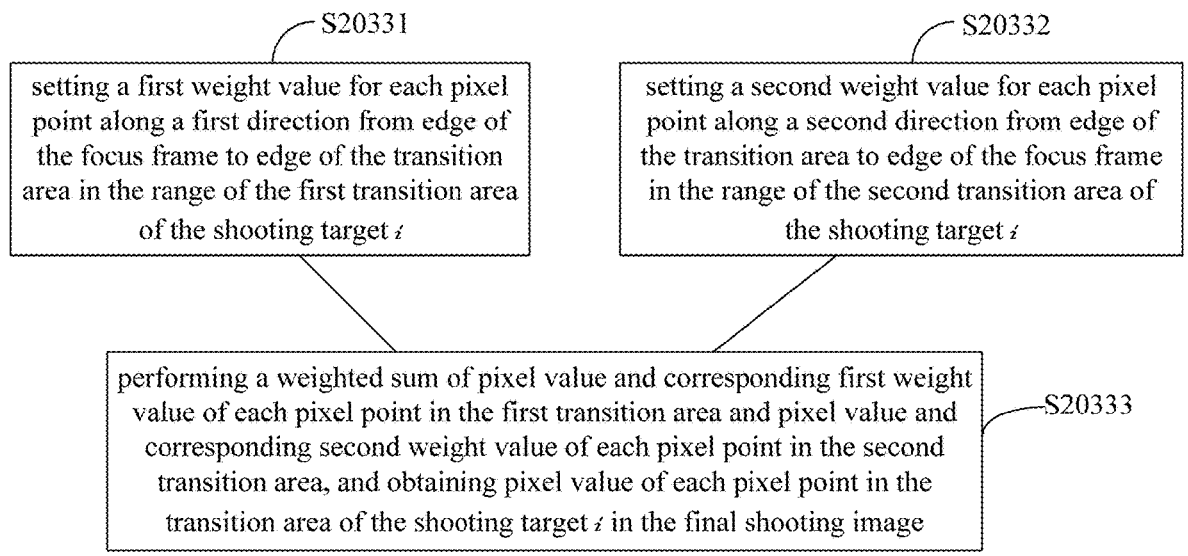
FIG. 4 is a flowchart of a image composing method according to one embodiment of the present disclosure.

In one embodiment of the present disclosure, as for step S2022, referring to FIG. 4, the present disclosure provides a method for composing images, the method specifically comprising:

S20331: setting a first weight value for each pixel point along a first direction from edge of the focus frame to edge of the transition area in the range of the first transition area of the shooting target i;

wherein the first weight value decreases gradually along the first direction;

S20332: setting a second weight value for each pixel point along a second direction from edge of the transition area to edge of the focus frame in the range of the second transition area of the shooting target i;

wherein the second weight value decreases gradually along the second direction;

S20333: performing a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

The present embodiment provides a shooting method for a terminal, in the auto focus processing, the images when the shooting target at the different depth of field is the sharpest are composed into the final preview image, which can make the shooting targets in different depth of field all clear in the final captured image.

Embodiment 2

Figure 5:
FIG. 5 is a schematic diagram of two shooting target with different depth of field according to one embodiment of the present disclosure.
Figure 6:
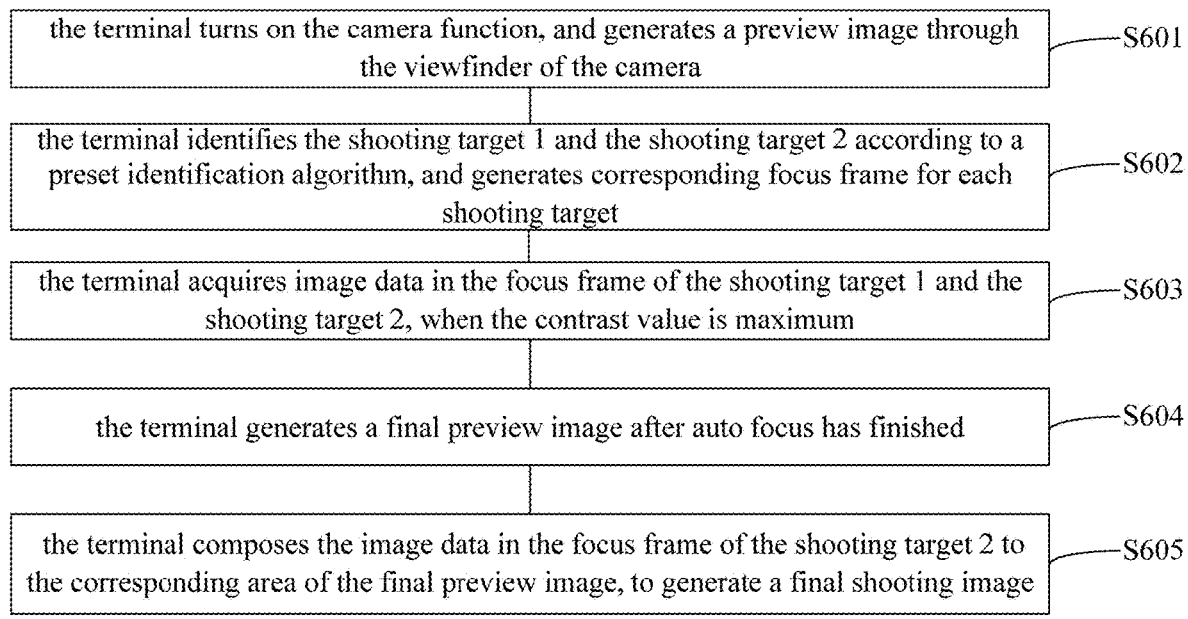
FIG. 6 is a flowchart of a shooting method for a terminal according to one embodiment of the present disclosure.

Based on the same technical idea of the above embodiment, taking two shooting targets in different depth of field shown in FIG. 5 as examples, the specific implementation process of the shooting method for a terminal is proposed. And it should be noted that the distances from the two shooting targets to the terminal are different. In this embodiment, the shooting target 1 is closer to the terminal, and the shooting target 2 is far from the terminal. The specific implementation process is as shown in FIG. 6, which comprising:

S601: the terminal turns on the camera function, and generates a preview image through the viewfinder of the camera.

Figure 7:
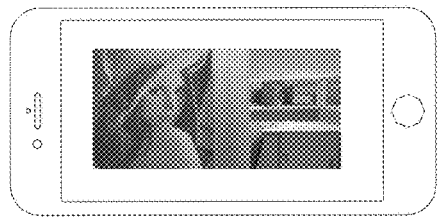
FIG. 7 is a schematic diagram of displaying preview image on a terminal according to one embodiment of the present disclosure.
Figure 8:
FIG. 8 is a schematic diagram of preview image according to one embodiment of the present disclosure.

It should be noted that, after the terminal generates the preview image, it can be displayed as shown in FIG. 7. A specific preview image is shown in FIG. 8. The left side of the preview image is the shooting target 1, and the right side of the preview image is the shooting target 2. It is learned that the shooting target 1 and the shooting target 2 are in different depth of field, and the shooting target 1 is closer to the terminal than the shooting target 2.

S602: the terminal identifies the shooting target 1 and the shooting target 2 according to a preset identification algorithm, and generates corresponding focus frame for each shooting target.

Specifically, as shown in FIG. 8, the white box on the left side of the preview image is the focus frame of the shooting target 1, and the white box on the right side of the preview image is the focus frame of the shooting target 2.

S603: the terminal acquires image data in the focus frame of the shooting target 1 and the shooting target 2, when the contrast value is maximum.

Specifically, in the present disclosure, the contrast characteristic of the pixel value of the shooting target is used as measure of definition, and when the contrast value of the pixel value of the shooting target is maximum, it means that the shooting target is in the clearest state.

Figure 9:
FIG. 9 is a schematic diagram of focus image according to one embodiment of the present disclosure.

Specifically, as shown in FIG. 8, in the auto focus processing of the terminal, the sequence of the depth of field of the auto focus usually varies from near to far and then to the near. Therefore, when the terminal captures the preview image, the camera focuses on the depth of field where the shooting target 1 is located. Therefore, at this time, the shooting target 1 is the clearest, and the shooting target 2 appears blurred;

with the movement of the lens controlled by VCM in the camera to achieve auto focus, the range of depth of focus of the camera is greater than the depth of field where the shooting target 1 located. At this time, the camera focuses and captures the depth of field of the shooting target 2, therefore, as shown in FIG. 9. As shown, the shooting target 2 is the clearest and the shooting target 1 appears blurred.

The terminal can obtain the image data of the shooting target in the focus frame when the shooting target is in the clearest, and buffers the data so that the data can be used for subsequent image composing.

S604: the terminal generates a final preview image after auto focus has finished.

In can be understood that, since the sequence of the depth of field of the auto focus usually varies from near to far and then to the near, the final preview image obtained by the terminal is the same as shown in FIG. 8, the shooting object 1 is the clearest, and the shooting object 2 is blurred.

S605: the terminal composes the image data in the focus frame of the shooting target 2 to the corresponding area of the final preview image, to generate a final shooting image.

Figure 10:
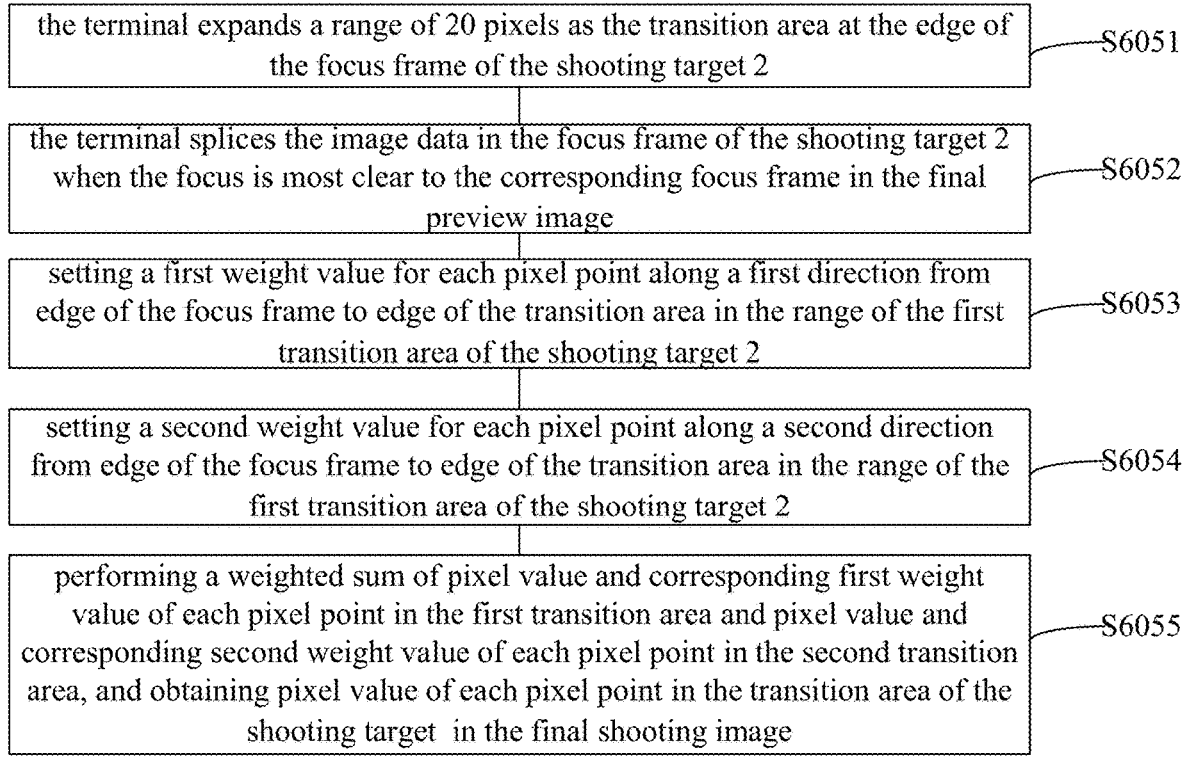
FIG. 10 is a flowchart of a method of generating shooting image according to one embodiment of the present disclosure.
Figure 11:
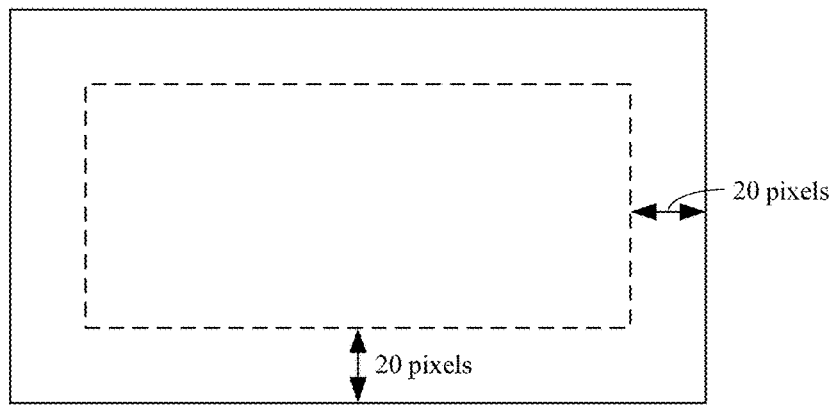
FIG. 11 is a schematic diagram of a transition area according to one embodiment of the present disclosure.

It should be noted that, since the shooting target 1 in the final preview image is the clearest, only the image data in the focus frame at the shooting target 2 needs to be merged into the final preview image. Therefore, in a specific implementation process, as shown in FIG. 10, step S605 may comprising:

S6051: the terminal expands a range of 20 pixels as the transition area at the edge of the focus frame of the shooting target 2;

It should be noted that, as shown in FIG. 11, the dashed line frame is the edge of the focus frame of the shooting target 2, and the area between the solid line frame and the dashed line frame is the transition area of the shooting target 2.

Figures 12, 13:
FIG. 12 is a schematic diagram of a weight value of pixel point in a transition area according to one embodiment of the present disclosure.
FIG. 13 is a schematic diagram of a final shooting image according to one embodiment of the present disclosure.

S6052: the terminal splices the image data in the focus frame of the shooting target 2 when the focus is clearest to the corresponding focus frame in the final preview image;

S6053: setting a first weight value for each pixel point along a first direction from edge of the focus frame to edge of the transition area in the range of the first transition area of the shooting target 2;

Wherein, the first transition area is the corresponding transition area when the focus of shooting target 2 is clearest; and the first weight value decreases gradually along the first direction; as shown in the upper part of the FIG. 12, the first weight value of the first direction decreases gradually form A1 to A20.

S6054: setting a second weight value for each pixel point along a second direction from edge of the focus frame to edge of the transition area in the range of the first transition area of the shooting target 2;

Wherein, the second transition area is the corresponding transition area of the shooting target 2 in the final preview image; and the second weight value decreases gradually along the second direction; as shown in the lower part of the FIG. 12, the second weight value of the second direction decreases gradually form B1 to B20.

S6055: performing a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

Specifically, take the pixel point A1 in the first transition area as an example, and the pixel value of the pixel point take the RGB value as an example. The weight of A1 is set to W_a1, the RGB value are R_a1, G_a1, B_a1; the corresponding pixel point to A1 in the second transition area is B20, the weight of B20 is W_b20, the RGB value are R_b20, G_b20, B_b20. The pixel point C20 is a pixel point after the composing of pixel point B20 and A1, the RGB value are R_c20, G_c20, B_c20, then the RGB value of C20 are:

$R\_c20 = R\_a1 \times W\_a1 + R\_b20 \times W\_b20;$ $G\_c20 = G\_a1 \times W\_a1 + G\_b20 \times W\_b20;$ $B\_c20 = B\_a1 \times W\_a1 + B\_b20 \times W\_b20;$ According to the weight shown in FIG. 12, the weight of the pixel B20 W_b20 is 5%, and the weight of the pixel A1 W_a1 is 95%. And the RGB values of the pixel C20 after the composing of the pixel B20 and the pixel A1 can be calculated, the RGB value of C20 are:

$R\_c20 = R\_a1 \times 95\% + R\_b20 \times 5\%;$ $G\_c20 = G\_a1 \times 95\% + G\_b20 \times 5\%;$ $B\_c20 = B\_a1 \times 95\% + B\_b20 \times 5\%;$ It can be understood that, the process of calculating the RGB values after composing of other pixel points in the transition area is the same as the above process, which will not be described in this embodiment.

After all the pixels in the transition area are composed according to the above calculation process, the final shooting image can be obtained. As shown in FIG. 13, the shooting target 1 and the shooting target 2 in different depth of field ranges are both become clear after the image composing. And the transition of the edge of the composing area is uniform, with no obvious boundaries.

Embodiment 3

Figure 14:
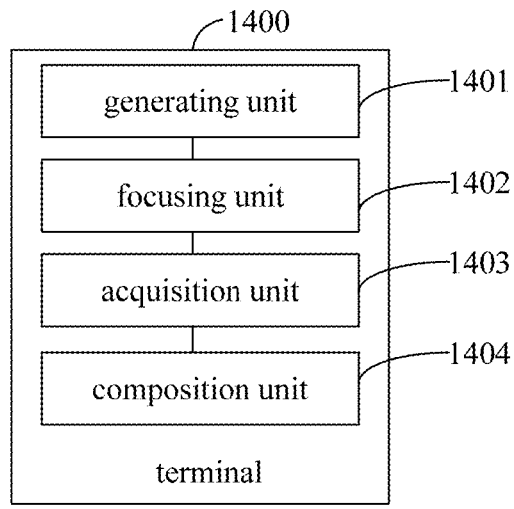
FIG. 14 is a schematic diagram of a terminal according to one embodiment of the present disclosure.

Based on the same technical idea of the above embodiment, referring to FIG. 14, FIG. 14 shows a schematic diagram of the terminal 1400 according to one embodiment of the present disclosure, wherein the terminal 1400 comprising: a generating unit 1401, a focusing unit 1402, an acquisition unit 1403 and a composition unit 1404, wherein, the generating unit 1401 is configured to generate a focus frame corresponding to a shooting target in a preview image;

the focusing unit 1402 is configured to perform shooting focus and triggering the acquisition unit during shooting focus;

the acquisition unit 1403 is configured to acquire image data in the focus frame of each shooting target when focus is the clearest;

the composition unit 1404 is configured to compose the image data in the focus frame of all the shooting target to generate a final shooting image, according to a preset image composing technology in a final preview image when determining focal length.

In the above scheme, the acquisition unit 1403 is further configured to: buffer the image data in the focus frame of the shooting target, when value of contrast of pixels of the shooting target is the largest.

Figure 15:
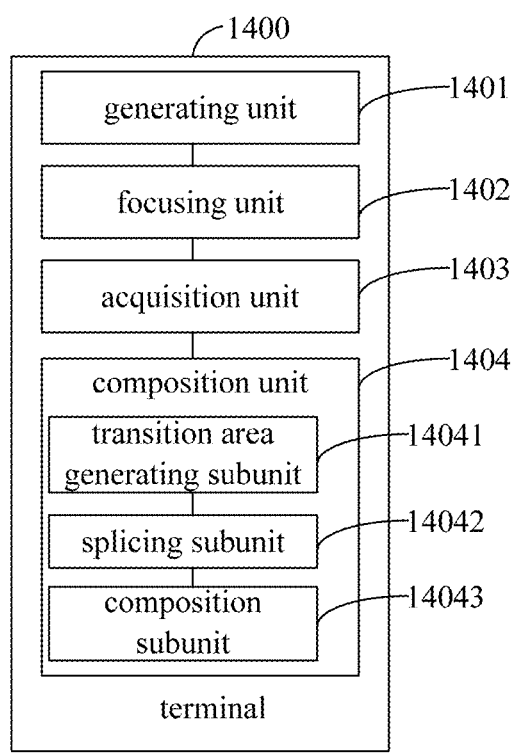
FIG. 15 is a schematic diagram of a terminal according to another embodiment of the present disclosure.

In the above scheme, referring to FIG. 15, the composition unit 1404 comprising: a transition area generating subunit 14041, a splicing subunit 14042, and a composition subunit 14043; wherein, the transition area generating subunit 14041 is configured to generate a transition area of a preset range at edge of the focus frame of the shooting target i; wherein, i is the sequence number of the shooting target, which ranges from 1 to N, and N is amount of shooting targets;

the splicing subunit 14042 is configured to splice the image data in the focus frame of the shooting target i when the focus is clearest to the corresponding focus frame in the final preview image;

the composition subunit 14043 is configured to compose image data of a first transition area corresponding to the shooting target i when the focus is clearest and image date of a second transition area corresponding to the shooting target i in the final preview image.

In the above scheme, the composition subunit 14043 is configured to set a first weight value for each pixel point along a first direction from edge of the focus frame to edge of the transition area in the range of the first transition area of the shooting target i; wherein the first weight value decreases gradually along the first direction;

set a second weight value for each pixel point along a second direction from edge of the transition area to edge of the focus frame in the range of the second transition area of the shooting target i; wherein the second weight value decreases gradually along the second direction;

perform a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

A computer storage medium according to one embodiment of the present disclosure, wherein the computer storage medium stores computer executable instructions, the computer executable instructions comprising:

generating a focus frame corresponding to a shooting target in a preview image;

acquiring image data in the focus frame of each shooting target when focus is the clearest during focusing process;

composing the image data in the focus frame of all the shooting target to generate a final shooting image, according to a preset image composing technology in a final preview image when determining focal length.

In one embodiment, the computer executable instructions further comprising:

buffering the image data in the focus frame of the shooting target, when value of contrast of pixels of the shooting target is the largest.

In one embodiment, the computer executable instructions further comprising:

generating a transition area of a preset range at edge of the focus frame of the shooting target i; wherein, i is the sequence number of the shooting target, which ranges from 1 to N, and N is amount of shooting targets;

splicing the image data in the focus frame of the shooting target i when the focus is clearest to the corresponding focus frame in the final preview image;

composing image data of a first transition area corresponding to the shooting target i when the focus is clearest and image date of a second transition area corresponding to the shooting target i in the final preview image.

In one embodiment, the computer executable instructions further comprising:

setting a first weight value for each pixel point along a first direction from edge of the focus frame to edge of the transition area in the range of the first transition area of the shooting target i; wherein the first weight value decreases gradually along the first direction;

setting a second weight value for each pixel point along a second direction from edge of the transition area to edge of the focus frame in the range of the second transition area of the shooting target i; wherein the second weight value decreases gradually along the second direction;

performing a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

In one embodiment, the computer executable instructions further comprising:

the shooting target is in the clearest state when contrast value of the pixel value of the shooting target is maximum, under the condition that contrast characteristic of the pixel value of the shooting target is used as measure of definition.

The terminal according to one embodiment of the present disclosure, the terminal comprising a processor and a storage, wherein, the storage stores computer executable instructions, the processor performs corresponding processing according to the computer executable instructions;

the processor is configured to:

generate a focus frame corresponding to a shooting target in a preview image;

acquire image data in the focus frame of each shooting target when focus is the clearest during focusing process;

compose the image data in the focus frame of all the shooting target to generate a final shooting image, according to a preset image composing technology in a final preview image when determining focal length.

In one embodiment, the processor is further configured to:

buffer the image data in the focus frame of the shooting target, when value of contrast of pixels of the shooting target is the largest.

In one embodiment, the processor is further configured to:

generate a transition area of a preset range at edge of the focus frame of the shooting target i; wherein, i is the sequence number of the shooting target, which ranges from 1 to N, and N is amount of shooting targets;

splice the image data in the focus frame of the shooting target i when the focus is clearest to the corresponding focus frame in the final preview image;

compose image data of a first transition area corresponding to the shooting target i when the focus is clearest and image date of a second transition area corresponding to the shooting target i in the final preview image.

In one embodiment, the processor is further configured to:

set a first weight value for each pixel point along a first direction from edge of the focus frame to edge of the transition area in the range of the first transition area of the shooting target i; wherein the first weight value decreases gradually along the first direction;

set a second weight value for each pixel point along a second direction from edge of the transition area to edge of the focus frame in the range of the second transition area of the shooting target i; wherein the second weight value decreases gradually along the second direction;

perform a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

In one embodiment, the processor is further configured to:

make the shooting target in the clearest state when contrast value of the pixel value of the shooting target is maximum, under the condition that contrast characteristic of the pixel value of the shooting target is used as measure of definition.

It should be noted that in the present disclosure, the terms 'comprising', 'including' or any other variant which is intended to encompass a non-exclusive inclusion, so as to include a series of elements of process, method, material or apparatus, and not only include those elements, but also include other elements that are not explicitly listed, or the elements that are inherent to these process, method, material or apparatus. In the absence of more restrictions, the elements defined by the statement 'comprising a . . . ' do not exclude the presence of the other same elements in the process, method, material or apparatus that includes the elements.

The above described embodiments of the present disclosure are only for the sake of description and do not represent the pros and cons of the embodiments.

With the description of the above embodiments, it will be apparent to those skilled in the art that the method of the above embodiments can be realized by software plus the necessary general hardware platform, and also can be realized by the hardware, but in many cases the former is a better embodiment. Based on this understanding, the technical solution of the present disclosure, in essence, or in the form of a prior art, can be embodied in the form of a software product, the software product stored in a storage medium (such as ROM/RAM, disk, CD-ROM), and the software product includes a number of instructions for enabling a terminal device (which may be a mobile phone, a computer, a server, or a network device, etc.) to perform the method described in the various embodiments of the present disclosure.

The above is only the preferred embodiments of the present disclosure, not to limit the scope of the present invention, any equivalent structure or equivalent process using the description of the present disclosure and the accompanying drawings, or directly or indirectly used in other related technical fields, are equally included in the protection of the present disclosure.

INDUSTRIAL UTILITY

A terminal, a shooting method thereof and a computer storage medium provided by the embodiments of the present invention, when shooting at the terminal, compose the clearest image of the shooting target with different depths of field during the shooting by a preset image composing technology. Thus, it is possible to make the shooting target in different depth of field clear in the shot image.

What is claimed is:

1. A shooting method for a terminal, the method comprising:
   generating a focus frame corresponding to a shooting target in a preview image;
   acquiring image data in the focus frame of each shooting target when focus is clearest during a focusing process;
   composing the image data in the focus frame of all the shooting target to generate a final shooting image, according to a preset image composing method in a final preview image when determining a focal length, wherein the composing of the image data includes:
      generating a transition area of a preset range at an edge of a focus frame of a shooting target i wherein i is a sequence number of the shooting target, ranges from 1 to N and N is a quantity of shooting targets;
      splicing the image data in the focus frame of the shooting target i when the focus is clearest to a corresponding focus frame in the final preview image; and
      composing image data of a first transition area corresponding to the shooting target i when the focus is clearest and image data of a second transition area corresponding to the shooting target i in the final preview image.

2. The method according to claim 1, wherein acquiring the image data in the focus frame of each shooting target includes:
   buffering the image data in the focus frame of the shooting target, when a contrast value of pixels of the shooting target is largest.

3. The method according to claim 1, wherein composing the image data of the first transition area corresponding to the shooting target i includes:
   setting a first weight value for each pixel point along a first direction from an edge of the focus frame to an edge of the transition area in a range of the first transition area of the shooting target i; wherein the first weight value decreases gradually along the first direction;
   setting a second weight value for each pixel point along a second direction from an edge of the transition area to an edge of the focus frame in a range of the second transition area of the shooting target i; wherein the second weight value decreases gradually along the second direction; and
   performing a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

4. The method according to claim 1, wherein:
   the shooting target is in a clearest state when a contrast value of a pixel value of the shooting target is maximum, under a condition that contrast characteristic of the pixel value of the shooting target is used as measure of definition.

5. A terminal, comprising:
   a processor, configured to:
   generate a focus frame corresponding to a shooting target in a preview image;

acquire image data in the focus frame of each shooting target when focus is clearest;

compose the image data in the focus frame of all the shooting target to generate a final shooting image, according to a preset image composing method in a final preview image when determining a focal length, wherein the processor is further configured to:

generate a transition area of a preset range at an edge of a focus frame of a shooting target i wherein i is a sequence number of the shooting target, ranges from 1 to N and N is a quantity of shooting targets;

splice the image data in the focus frame of the shooting target i when the focus is clearest to a corresponding focus frame in the final preview image; and compose image data of a first transition area corresponding to the shooting target i when the focus is clearest and image data of a second transition area corresponding to the shooting target i in the final preview image.

6. The terminal according to claim 5, wherein the processor is further configured to:

buffer the image data in the focus frame of the shooting target, when a contrast value of pixels of the shooting target is largest.

7. The terminal according to claim 5, wherein the processor is further configured to:

set a first weight value for each pixel point along a first direction from an edge of the focus frame to an edge of the transition area in a range of the first transition area of the shooting target i; wherein the first weight value decreases gradually along the first direction;

set a second weight value for each pixel point along a second direction from an edge of the transition area to an edge of the focus frame in a range of the second transition area of the shooting target i; wherein the second weight value decreases gradually along the second direction; and perform a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

8. The terminal according to claim 5, wherein, the processor is further configured to make the shooting target in a clearest state when a contrast value of a pixel value of the shooting target is maximum, under a condition that contrast characteristic of the pixel value of the shooting target is used as measure of definition.

9. A terminal, comprising:

a processor and a storage, wherein, the storage stores computer executable instructions, the processor performs corresponding processing according to the computer executable instructions, and the processor is configured to:

generate a focus frame corresponding to a shooting target in a preview image;

acquire image data in the focus frame of each shooting target when focus is clearest during a focusing process;

compose the image data in the focus frame of all the shooting target to generate a final shooting image, according to a preset image composing method in a final preview image when determining a focal length, wherein the processor is further configured to:

generate a transition area of a preset range at an edge of a focus frame of a shooting target i; wherein i is a sequence number of the shooting target, ranges from 1 to N, and N is a quantity of shooting targets;

splice the image data in the focus frame of the shooting target i when the focus is clearest to a corresponding focus frame in the final preview image; and compose image data of a first transition area corresponding to the shooting target i when the focus is clearest and image data of a second transition area corresponding to the shooting target i in the final preview image.

10. The terminal according to claim 9, wherein the processor is further configured to:

buffer the image data in the focus frame of the shooting target, when a contrast value of pixels of the shooting target is largest.

11. The terminal according to claim 9, wherein the processor is further configured to:

set a first weight value for each pixel point along a first direction from an edge of the focus frame to an edge of the transition area in a range of the first transition area of the shooting target i; wherein the first weight value decreases gradually along the first direction;

set a second weight value for each pixel point along a second direction from an edge of the transition area to an edge of the focus frame in a range of the second transition area of the shooting target i; wherein the second weight value decreases gradually along the second direction; and perform a weighted sum of pixel value and corresponding first weight value of each pixel point in the first transition area and pixel value and corresponding second weight value of each pixel point in the second transition area, and obtaining pixel value of each pixel point in the transition area of the shooting target i in the final shooting image.

12. The terminal according to claim 9, wherein the processor is further configured to:

make the shooting target in a clearest state when a contrast value of a pixel value of the shooting target is maximum, under a condition that contrast characteristic of the pixel value of the shooting target is used as measure of definition.

* * * * *